July 18, 1950
F. HOWARD
2,515,827
PRONGED STUD FASTENER
Filed June 29, 1948
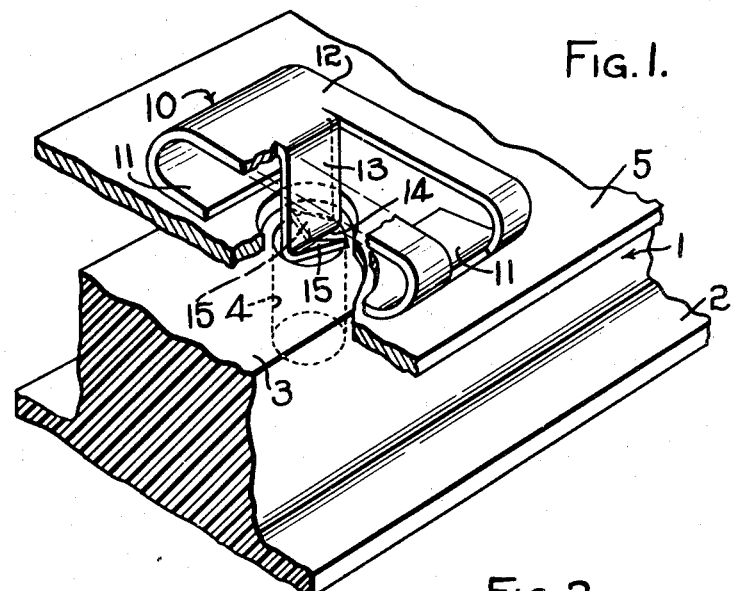
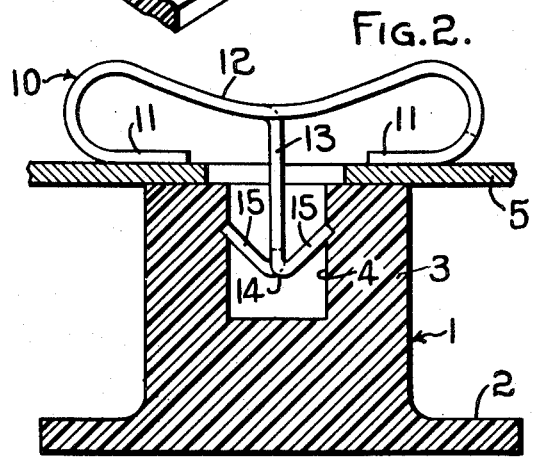
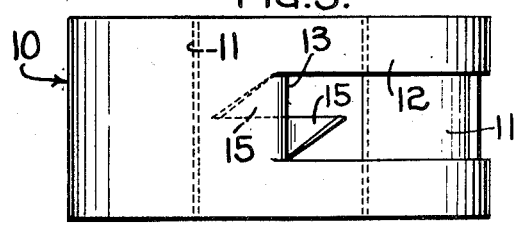
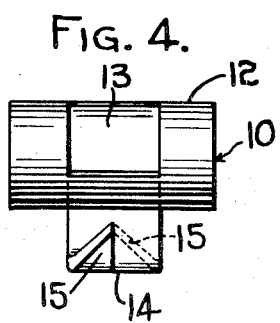
INVENTOR.
FORBES HOWARD.
BY Philip E. Parker
ATTORNEY.

Patented July 18, 1950

2,515,827

UNITED STATES PATENT OFFICE 2,515,827

PRONGED STUD FASTENER

Forbes Howard, Grosse Pointe, Mich., assignor to United-Carr Fastener Corporation, Cambridge, Mass., a corporation of Michigan Application June 29, 1948, Serial No. 35,901

2 Claims. (Cl. 24—73)

The present invention relates to fasteners and more particularly to fasteners adapted to secure a part provided with a bore tightly against an apertured support and the invention aims generally to improve such fasteners.

Many thermoplastic materials are used as mouldings, trim and like on various and sundry machines and appliances, in some of which, for example refrigerators, the thermoplastic part is subjected to extreme cold with a resulting contraction in its major dimensions. Where such part is to be secured in close assembled relation with a support, it is desirable that the fastener therefore be of such construction that it will compensate for changes in dimensions of supported part.

A primary object of the invention is the provision of a simple, one piece fastener designed to hold a thermoplastic moulding, trim or the like, which may be subject to substantial expansion and contraction due to temperature changes, securely against an apertured support.

A further object of the invention is the provision of a fastener as above described which will be simple in construction, effective in use, economical in cost of manufacture and readily installed in a fastener secured installation.

The above and other objects of the invention will be apparent to persons skilled in the art from a consideration of the accompanying drawings and annexed specification illustrating and describing a preferred form of the invention.

In the drawings:

Fig. 1 is a perspective view of a preferred form of fastener illustrated, partly cut away, in position to be applied to an apertured support and a part to be supported thereon, the latter being shown in section;

Fig. 2 is a sectional view illustrating the parts of the installation in fastened position;

Fig. 3 is a top plan view of the fastener shown in Figs. 1 and 2; and

Fig. 4 is an end elevation of the fastener shown in Fig. 3.

Referring further to the drawings, the invention is primarily intended for use in securing a molded thermoplastic part 1 to a sheet metal support 5 though it will be understood that the invention is not restricted to such use.

The part 1 to be supported may be of any shape or construction suitable for the purpose but preferably includes an elongated strip 2 of channelled cross-section in which may be disposed an integral transverse wall or projection 3 having a bore 4.

The molded thermoplastic part 1 is designed to be secured to the support 5 with the bore 4 of the part 1 in alignment with the aperture 6 of the support by means of a suitable fastener having a portion engaging an opposite face of the support and another portion extending into the bore 4. As the thermoplastic member 1, and particularly the projection 3 thereof is subject to expansion and contraction due to excessive temperature changes, the fastener should be a compensating fastener in order to hold the part 1 tightly against the support 5.

According to the invention the fastener member comprises a central body portion 10 preferably in the form of an elongated looped member having one side gapped to provide spaced support-engaging ends 11. The body portion 10 is advantageously formed of a strip of spring metal so that the bight portion 12 thereof is disposed opposite the ends 11 and is movable under compression relative thereof.

The fastener member includes a movable part-engaging stud 13 connected to the bight portion and extending in a direction normal thereto between and beyond the ends 11. Preferably the stud may be cut from the body of the bight portion 12 and bent angularly thereto as shown in Figs. 1, 3 and 4 and the free terminal end 14 of the stud 13 is provided with means for engaging and gripping a bore wall of the part 1 to be supported. In the illustrated embodiment of the invention, this part-engaging and gripping means may be in the form of a reversely extending angularly disposed pointed hook 15 adapted to bite into the body of the projection 3 surrounding the stud-receiving bore 4. If desired the prongs 15 may be disposed on opposite sides of the stud 13 and are resilient relative thereto so as to expand outwardly in biting engagement with the wall of the bore 4 as the stud is pushed into the bore.

In use the part 1 to be supported is positioned relative to the support 5 so that the bore 4 is aligned with the aperture 6 of the support. The fastener is applied from the opposite side of the support by inserting the stud 13 through the aperture 6 and into the bore a sufficient distance to cause the resilient prongs 15 to bite into the wall of the bore 4 and place the bight portion 12 of the central body portion 10 under tension. The part 1 will then be held tightly against the support 5 regardless of variation in dimension of the projection 3 due to temperature changes.

Although I have illustrated and described a preferred embodiment of the invention, I do not intend to be limited to the details thereof as the scope of the invention is best defined in the appended claims.

I claim:

1. A fastener for securing to an apertured support a part having a bore therein comprising a base of thin resilient material including opposed spaced support-engaging ends of U-shaped cross-section opening toward each other, and a transversely resilient integral connecting portion extending between corresponding leg portions of said ends, the free leg portions of said ends providing support-engaging surfaces in substantially the same plane spaced transversely from said connecting portion, and a stud extending from said connecting portion substantially normal thereto in the direction of the plane of said free leg portions and extending substantially beyond said plane, said stud being provided at its end opposite said connecting portion with projections extending angularly toward said connecting portion, said projections including biting edges at their extremities whereby said stud may be inserted through the aperture of a support into a bore of a part to be supported to engage the walls of such a bore tensioning said connecting portion and holding said support-engaging surfaces against the face of such a support.

2. A fastener in accordance with claim 1 wherein the stud comprises a strip cut from the base portion and extending integrally from the connecting portion and the angularly extending projections on the stud comprise portions of the free end of the strip bent to extend angularly toward the connecting portion.

FORBES HOWARD.

REFERENCES CITED

The following references are of record in the file of this patent:

UNITED STATES PATENTS

| Number | Name | Date |
|---|---|---|
| 1,873,871 | Carr | Aug. 23, 1932 |
| 2,051,407 | Jones | Aug. 18, 1936 |
| 2,193,306 | Tinnerman | Mar. 12, 1940 |
| 2,315,211 | Kost | Mar. 30, 1943 |
| 2,360,647 | Churchill | Oct. 17, 1944 |